W. R. MURPHY.
SLED PROPELLER.
APPLICATION FILED MAY 19, 1910.
971,302.
Patented Sept. 27, 1910.
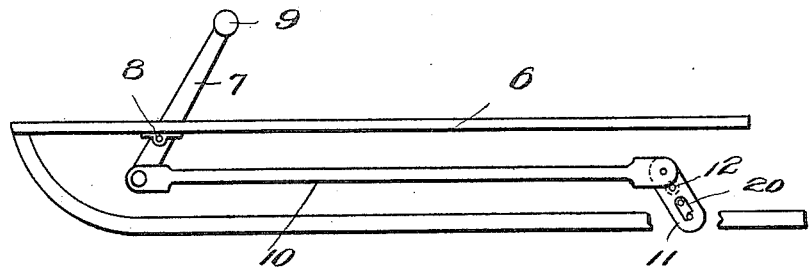
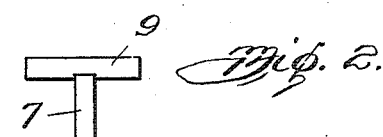
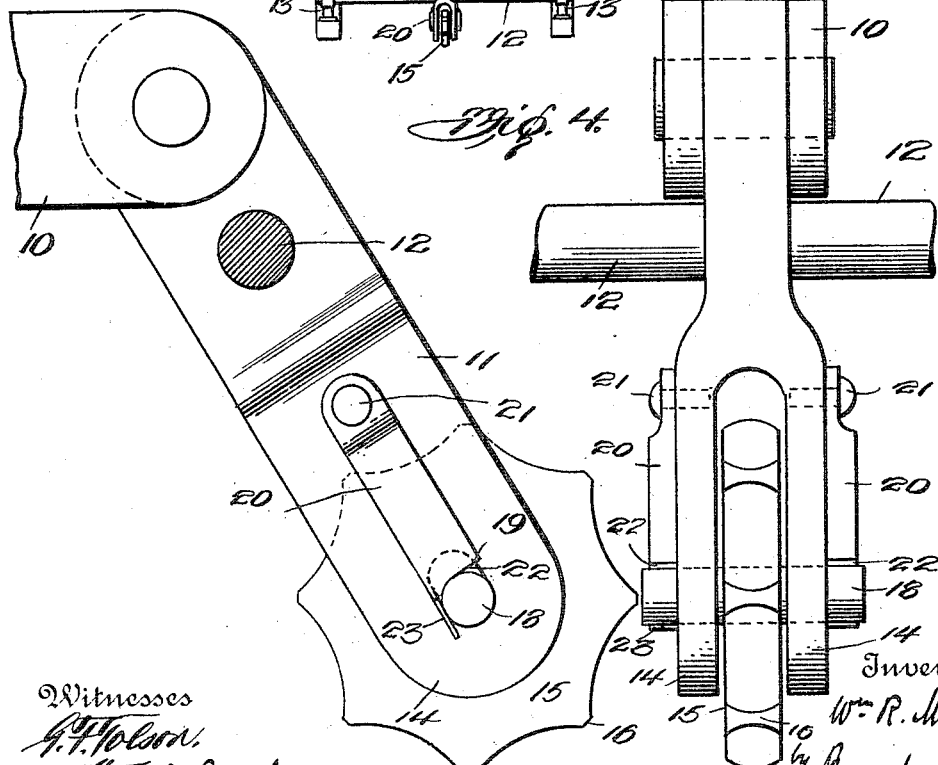
Witnesses
G. F. Folson
Edith L. Smith
Inventor
Wm. R. Murphy
by Romnhardt & Co.
Attorneys

UNITED STATES PATENT OFFICE.

WILLIAM R. MURPHY, OF CHICAGO, ILLINOIS.

SLED-PROPELLER.

971,302.  Specification of Letters Patent.  Patented Sept. 27, 1910.

Application filed May 19, 1910. Serial No. 562,180.

*To all whom it may concern:*

Be it known that I, WILLIAM R. MURPHY, citizen of the United States, residing at Chicago, in the county of Cook and State of Illinois, have invented certain new and useful Improvements in Sled - Propellers, of which the following is a specification.

This invention relates to sled propellers, and has for its object to provide a mechanism especially adapted for the propulsion of small sleds, such as those used by children.

The device comprises a lever operated pusher, having improved means for effecting engagement and disengagement with the rod, as the lever is operated, to advance the sled.

The invention is illustrated in the accompanying drawings in which—

Figure 1 is a side elevation, partly broken away, of a sled provided with the improvement. Fig. 2 is a rear end view. Figs. 3 and 4 are enlarged details of the pusher, in side and rear elevation.

Referring specifically to the drawings, the sled is indicated at 6. An operating lever 7 is pivoted at 8 to the sled top, and works in a slot therein, said lever has at its outer end a handle 9. Its lower end is connected by a rod 10, which extends lengthwise under the sled top, to a pusher lever 11 which rocks on a cross shaft 12 mounted in supports 13 upon the sled runners. The pusher lever 11 is forked at its lower end as indicated at 14, and a wheel 15 is located between the branches of the fork, said wheel having projections 16 at the rim thereof to engage the snow or ice. The spindle 18 of the wheel is mounted at its opposite ends in slots 19 in the branches of the fork 14, said slots extending lengthwise so that the wheel can lift and drop when the lever is vibrated.

The up and down movement of the wheel 15 is controlled by two latches 20 which are pivoted at 21 to the sides of the fork 14 and have a recessed portion 22 at their lower ends arranged to engage the projecting ends of the spindle 18 at the lower end of the slots 19. On the rear side, or side toward the back of the sled, the recesses 22 are open, but on the front side there is a projection 23 which causes the latch to stop against the spindle 18 when in position in line with the pivot 12 and the spindle of the wheel, thereby locking the wheel in its lowest or extended position.

In operation, when the lever is vibrated as by a child sitting on the sled, the back stroke of the lever swings the pusher lever 11 so that its lower end swings backwardly and the engagement of the wheel 15 with the road forces the sled forwardly, the wheel being locked in low position by the latches 20 as above explained. On the forward stroke of the lever 7, the lower end of the lever 11 swings forwardly. The contact of the wheel 15 with the ground, at the beginning of this movement, causes said wheel to turn in the direction shown by the arrow *a*, and the consequent rotation of the spindles 18 causes them to throw the latches 20 forwardly, the lower end of the latches being in contact with the spindles as above explained. The effect of this is to swing the latches forwardly and disengage the same from the spindles, allowing the spindles to lift in the slots 19, and consequently allowing the wheel 15 to pass forwardly beyond a vertical line dropped from the axis 12, when the lever 11 swings to its complete forward position, the weight of the wheel 15 causes the same to drop, and when the spindle 18 reaches the lower ends of the slots 19 the latches 20 drop by gravity and again lock the same, in readiness for the next pushing stroke; and the operation proceeds continuously as above described as long as the lever 7 is operated.

Although illustrated in connection with a sled the same device may be applied to a wagon or other wheeled vehicle.

Having thus described the invention what I claim as new and desire to secure by Letters Patent is:—

1. A pusher for vehicles, comprising a lever, a road engaging device carried at the lower end of said lever and slidable up and down thereon, means to lock said device in lowest position during the back stroke of the lever, and means to release said device, to allow it to lift, during the forward stroke of the lever.

2. A pusher for vehicles, comprising a lever, a road wheel mounted to slide up and down at the lower end of the lever, and automatic means to hold said wheel in lowest position during the back stroke of the lever and to release the wheel and allow it to lift during the forward stroke of the lever.

3. A pusher for vehicles, comprising a lever slotted at its lower end, a road wheel the spindle of which is slidable up and down in said slots, and means to automatically engage the spindle and hold the same at the lower end of the slot during the back stroke of the lever and to release the spindle and allow the wheel to lift during the forward stroke of the lever.

4. A pusher for vehicles, comprising a lever with a slotted fork at its lower end, a road wheel located in the fork and having a spindle projecting into said slots, and latches pivoted to the lever above said slots and engageable with the spindle to hold the same in the lower end of the slots during the back stroke of the lever, the latches being automatically disengaged by turning of the spindles during the forward stroke of the lever, to allow the wheel to lift.

5. A pusher for vehicles, comprising a lever with a slotted fork at its lower end, a road wheel located in the fork and having a spindle projecting into said slots, and latches pivoted to the lever above said slots, and having recessed lower ends which engage the spindle and lock the same in the lower ends of the slots during the back stroke of the lever, and are swung forwardly and disengaged by the friction of the spindle as the wheel rotates during the forward stroke of the lever.

In testimony whereof, I affix my signature in presence of two witnesses.

WILLIAM R. MURPHY.

Witnesses:
NELLIE FELTSKOG,
H. G. BATCHELOR.